Patented Oct. 9, 1951

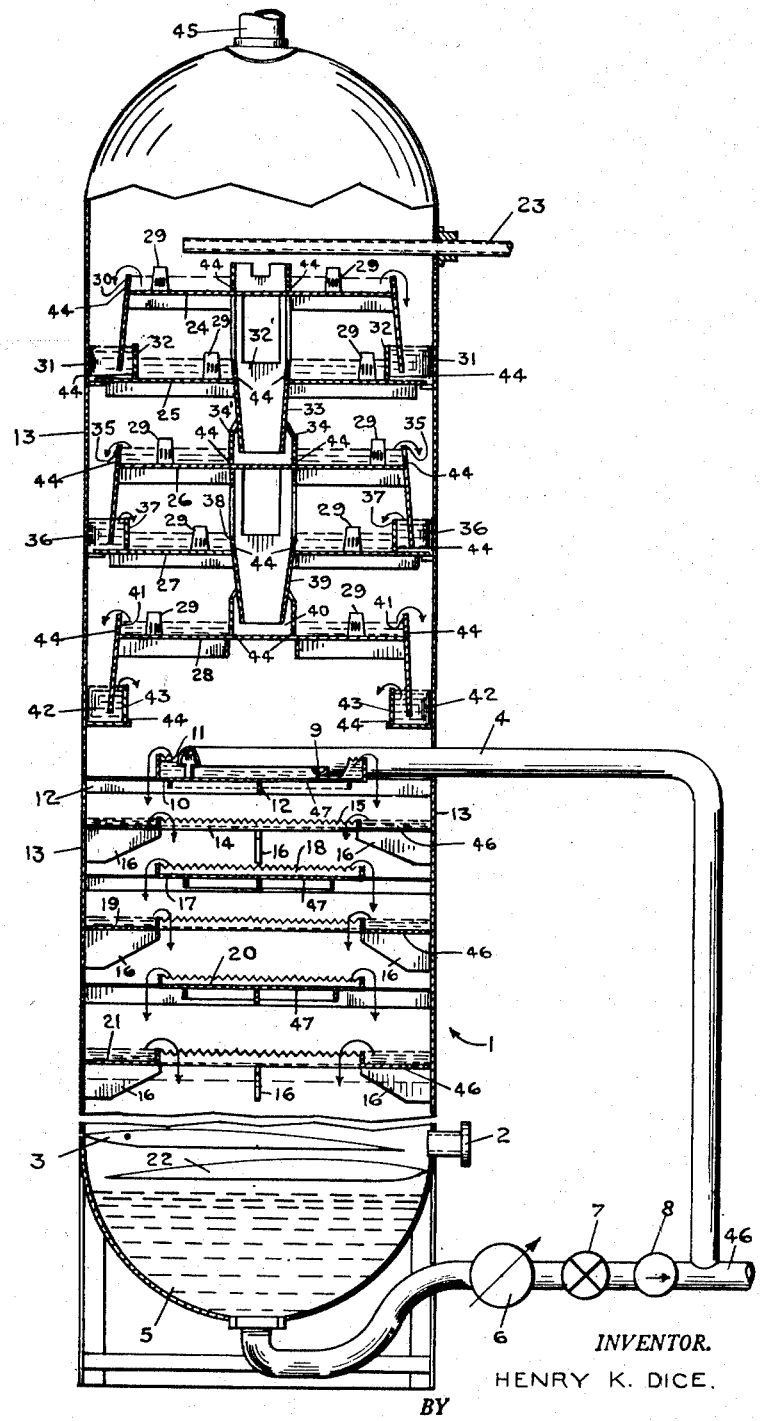

2,570,215

UNITED STATES PATENT OFFICE 2,570,215

PRODUCTION OF FORMALDEHYDE FROM OXIDATION OF BUTANE

Henry K. Dice, Corpus Christi, Tex., assignor to Celanese Corporation of America, a corporation of Delaware Application January 5, 1949, Serial No. 69,353

7 Claims. (Cl. 260—604)

This invention relates to a process for the treatment of a mixture of oxygenated organic compounds formed by the vapor phase partial oxidation of aliphatic hydrocarbons, and also to an improved apparatus whereby control of the oxidation reaction and a partial separation of the reaction products may be effected simultaneously.

The vapor phase, partial oxidation of aliphatic hydrocarbons, such as propane or butane or mixtures thereof, employing air or oxygen as the oxidizing agent yields a complex mixture of products including formaldehyde, acetaldeyhde, methanol, acetone, methyl ethyl ketone, tetrahydrofuran and various oxides. The oxidation is effected by mixing butane or propane with a predetermined amount of air or oxygen, heating the mixture to reaction temperature and allowing the resulting exothermic oxidation reaction to proceed to the desired degree. Since only partial oxidation is desired, the reaction temperature must be controlled within precise limits and then completely halted when the desired degree of oxidation has been effected. The halting of the reaction may be accomplished rapidly by lowering the temperature of the gaseous reaction mixture of oxygenated products to a point where the oxidation reaction will no longer be self-supporting, for example, by quenching the hot reaction gases with a stream of cool water. Upon quenching the gaseous reaction mixture, the product obtained comprises an aqueous solution of oxygenated organic compounds. This solution is then subjected to a complex purification process to separate it into its several components. At the temperatures to which the reaction gases are reduced during the quenching step, e. g. about 200 to 250° F., and under the pressure employed, the formaldehyde in the reaction mixture is found to be the most soluble of the several oygenated compounds present. This is due to the fact that the vapor pressure of formaldehyde is lowered by the formation of methylene glycol in water solution so that the remaining components remain essentially uncondensed due to their greater relative volatility at the absorber temperature. For efficient operation, it is highly advantageous to effect at the quenching stage of the process as complete a separation of the formaldehyde as is possible.

It is, therefore, an important object of this invention to provide an improved process for the treatment of the gaseous mixture of oxygenated reaction products produced by the vapor phase oxidation of propane or butane whereby the extent of the vapor phase hydrocarbon oxidation reaction is effectively controlled and the formaldehyde present in the reaction product may be separated in a highly efficient manner.

Another object of my invention is to provide an improved apparatus wherein the continuous aqueous quenching of the hot reaction gases may be effected together with the simultaneous absorption and separation of the formaldehyde present in the gaseous reaction mixture.

Other objects of this invention will appear from the following detailed description and the accompanying drawing.

I have now found that the vapor phase partial oxidation of hydrocarbons, such as propane or butane with oxygen or air at elevated temperature and pressure may be closely controlled to yield a maximum of valuable oxygenated organic compounds and the formaldehyde separated therefrom in an efficient manner if the hot gaseous reaction mixture formed as the product of the oxidation reaction is quenched, to reduce the temperature thereof below oxidation temperature, by being brought into contact with a continuously circulating counter currently-flowing cooled aqueous solution of formaldehyde whereby the major part of the formaldehyde present is removed, and the formaldehyde remaining in the uncondensed vapors, after said quenching step, is then stripped therefrom by extracting the vapors with fresh water. The aqueous solution of formaldehyde formed when the fresh water comes in contact with the uncondensed vapors following the initial quench and formaldehyde absorption is relatively dilute, i. e. of a concentration of from 3 up to about 6% by weight, and is added to the circulating stream of aqueous formaldehyde quench liquid to further aid in the quenching of the hot gases. A side stream of the circulating aqueous formaldehyde is preferably continuously drawn off in a volume equivalent to that of the entering fresh water feed to maintain the volume of the combined circulating aqueous formaldehyde quench liquor uniform.

The aqueous formaldehyde solution employed as the quench liquid is preferably cooled to a temperature of about 100 to 150° F. before being brought into contact with the hot reaction gases and the volume of aqueous formaldehyde being circulated should be such that it will reach a maximum temperature of about 200° F. after quenching the hot reaction gases and absorbing both the sensible heat and a portion of the latent heat present therein. The fresh water feed may be introduced in such volume as to effect a sufficient degree of dilution of the circulating formaldehyde quench liquor so that the formaldehyde concentration therein is from about 5 to 25% by weight but optimum results are obtained if the degree of dilution is such that the formaldehyde concentration in the circulating quench liquor is from about 10 to about 15% by weight. The fresh water may be introduced at a temperature of 60 to 120° F. Thus, under the conditions employed, the relative volatility of the formaldehyde is low and the remaining oxygenated compounds, except for some of the methanol formed, pass through the system in uncondensed form to be later separated in a subsequent purification process.

My novel process will now be described with reference to the accompanying drawing, the figure of which is a side elevational view, partly in section showing a novel apparatus for carrying out the improved quenching and formaldehyde separation process of my invention.

Referring now to the drawing, the hot gaseous mixture of reaction products from the vapor phase partial oxidation of propane or butane is introduced into a vessel generally indicated by reference numeral 1 through a vapor inlet 2. The hot gases are deflected upwardly by the top surface of a baffle 3 where they are met by a plurality of cascading streams of cooled aqueous formaldehyde, which streams reduce the temperature of said gases sufficiently to halt further oxidation. The aqueous formaldehyde solution employed as the quench liquor is that formed by quenching and extracting the reaction gases previously passed through the system. The quench liquor is introduced into vessel 1 by means of a pipe 4, being withdrawn from the body of liquid 5 in the base of vessel 1. The hot quench liquid 5 is cooled by being passed through a cooler 6, a valve 7 and is then forced upwardly into vessel 1 through pipe 4, by a pump 8.

The end of pipe 4 is cut away, as shown, to form a slot 9 which acts to distribute the liquid substantially uniformly on a circular baffle 10 provided with a sawtooth lip or weir 11 for liquid holdup. Circular baffle 10 is supported by a pair of rectangular supporting bars 12 which cross each other at right angles, the ends of which are suitably welded, for example, so as to be integral with the shell 13 of vessel 1. The liquid pumped on to baffle 10 continuously overflows weir 11 except for the holdup liquid and cascades on to an annular baffle 14 which is open in the center and provided with a circumferential-saw-tooth lip or weir 15 surrounding the central opening. Baffle 14 is supported by a plurality of brackets 16 integral with shell 13. The liquid, after baffle 14 is filled, overflows and cascades over weir 15, falling through the central opening on to another circular baffle 17 identical in structure with circular baffle 10. The liquid on baffle 17 pours over a saw-toothed lip or weir 18 integral with baffle 17 and down to another annular baffle 19 identical in structure with baffle 14. The liquid continues on its downward path over circular baffle 20 and annular baffle 21 and the tortuous path thus provided for the gaseous reaction vapors entering through inlet 2 enables the countercurrently-flowing liquid stream to extract a major part of the formaldehyde therefrom. Baffle 20 is substantially identical in both structure and manner of support with baffles 10 and 17, and baffle 21 is substantially identical in structure and support with baffles 14 and 19. The cascading streams of cooled aqueous formaldehyde effectively quench the hot reaction gases and wash out substantially all of the water-soluble gaseous formaldehyde present therein. The hot aqueous formaldehyde solution resulting from both the extraction and heat exchange with the hot gases falls on to baffle 3 and, after flowing downward on to baffle 22 joins the body of hot liquid 5 in the base of vessel 1.

In order to ensure the complete absorption of the formaldehyde in the hot reaction gases, the unabsorbed gases then rise through a second absorption section where a very thorough and intimate mixing of the gases is effected with fresh water which enters vessel 1 through a water inlet pipe 23.

The upper absorption section comprises a series of horizontal trays 24, 26 and 28 alternating with horizontal trays 25 and 27, each of trays 24, 25, 26, 27 and 28 being provided with a plurality of bubble caps 29 of the usual design and construction. The structure provided is such that the pressure drop through the bubble caps is sufficiently low to insure intimate contact of the vapors moving upward with the water present on said bubble cap trays. Bubble caps 29 are shown on a greatly enlarged scale in the interest of clarity, the number of bubble caps per tray being, usually several hundred in number.

The fresh water feed coming in through pipe 23 falls on tray 24 and, as the liquid level on tray 24 builds up, the overflow passes over weirs 30, the overflow falling into liquid seals 31. The overflow from liquid seals 31 passes over weirs 32 and across bubble cap tray 25 passing over a weir 32' and through a liquid downcomer 33 to lower tray 26. Weirs 30 and 32 are not circular but are secants of the circular shell and liquid seals 31 are not interconnected but are independent, one liquid seal being on one side of tray 25 and the other liquid seal 31 being on the opposite side. Furthermore, weir 32' and downcomer 33 are rectangular in horizontal cross-section but may, of course, be of any convenient shape, such as for example, square or circular.

The liquid overflow passing through downcomer 33 builds up in a rectangular vapor trap 34 to form a liquid seal and the overflow from the seal passes over an open rectangular weir 34' and across tray 26. From tray 26 the liquid flows over weirs 35 and down into liquid seals 36 which are duplicates in structure of liquid seals 31. From liquid seals 36 the liquid flows over weirs 37, over a rectangular weir 38, down to tray 28 through a rectangular liquid downcomer 39 and into a vapor trap 40 which also forms a liquid seal. The flow of the liquid across tray 28 is the same as that across tray 26 and the overflow falls over weir 41 into liquid seals 42 from which it passes downward over weirs 43 and on to circular baffle 10. Liquid seals 42 are of a structure identical with liquid seals 31 and 36.

Since the vapors are forced up through bubble caps 29 on each of trays 24, 25, 26, 27 and 28 because of the liquid seals which prevent any bypassing of the vapors, a very thorough absorption of the formaldehyde in the fresh water feed is effected. A plurality of drain holes 44 of a relatively small diameter are provided for draining the several trays and liquid seals when the apparatus is off stream, as for cleaning and the like. Holes 44 are not large enough or sufficient in number to interfere with the pressure drop through the system to prevent efficient extraction of the vapors. The uncondensed vapors leave vessel 1 through a vapor outlet 45, and are collected in any suitable manner. A plurality of drain holes 46 are provided for draining baffles 14, 19 and 21 while drain holes 47 are provided for draining baffles 16, 17 and 20.

When bringing the novel apparatus of my invention into operation, a stream of fresh water is pumped into vessel 1 through inlet 23 and a water layer is built up on each of bubble cap trays 24, 25, 26, 27 and 28, the overflow pouring over the several weirs to form the desired liquid seals 31, 36 and 42. The water overflows weir 43 and cascades on to quench baffles 10, 14, 17, 20 and 21, a layer of liquid building up on each of said baffles, as shown. When the various trays, traps and baffles are filled with water and the base filled to the operating level, the mixture of hot reaction gases produced by the vapor phase partial oxidation of the hydrocarbons is then introduced into vessel 1 through vapor inlet 2. The gases are immediately quenched below reaction temperature on striking the cooled liquid passing over annular baffle 21 and through the water cascading down the baffles 20, 17, 14 and 10, respectively. Further oxidation is thus immediately halted and the major part of the formaldehyde is absorbed. The uncondensed reaction gases then pass up through the bubble caps 29 on each of the bubble cap trays 28, 27, 26, 25 and 24, respectively, and the formaldehyde remaining in the uncondensed reaction vapors is absorbed in the water on said trays. Except for some methanol which is absorbed, the remaining uncondensed oxygenated organic compounds pass out of vessel 1 through vapor outlet 45.

In order to build up the concentration of formaldehyde in the body of liquid 5 to the desired degree, when starting up, fresh water feed through pipe 23 is halted for a short time and the liquid 5 is continuously withdrawn from vessel 1, passed through cooler 6 and continuously circulated through pipe 4 back into vessel 1 by means of pump 8 before a side stream is taken off. When the formaldehyde concentration in the circulating liquid is at the desired level, i. e. from about 5 to 25% by weight and, preferably, from about 10 to about 15% by weight, a side stream is continuously withdrawn through a line 46 and the fresh make-up feed in equivalent amount is then resumed and continuously introduced into vessel 1 through pipe 23.

My novel process and apparatus not only permits of the oxidation reaction to be controlled properly by the quenching step but also provides an efficient and economical means for separating the formaldehyde from the remaining oxygenated products in the form of a relatively concentrated solution with substantially no fouling of the system by tars, resins and like insoluble compounds formed during the initial vapor phase partial oxidation reaction.

It is to be understood that the foregoing detailed description is given merely by way of illustration and that many variations may be made therein without departing from the spirit of my invention.

Having described my invention, what I desire to secure by Letters Patent is

1. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde, bringing the hot reaction gases into contact with said aqueous solution of formaldehyde to halt the oxidation reaction and to extract preferentially from the reaction gases a portion of the formaldehyde contained therein, bringing the reaction gases into contact with water to extract preferentially the unabsorbed formaldehyde in said reaction gases to form a dilute solution of formaldehyde while the major portion of the remaining oxygenated products pass through the system in uncondensed form, and adding the dilute solution of formaldehyde to the circulating aqueous solution of formaldehyde.

2. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 5 to 25%, bringing the hot reaction gases into contact with said aqueous solution of formaldehyde to halt the oxidation reaction and to extract preferentially from the reaction gases a portion of the formaldehyde contained therein, bringing the reaction gases into contact with water to extract preferentially the unabsorbed formaldehyde in said reaction gases to form a dilute solution of formaldehyde while the major portion of the remaining oxygenated products pass through the system in uncondensed form, and adding the dilute solution of formaldehyde to the circulating aqueous solution of formaldehyde.

3. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 5 to 25% and having a temperature of between about 100 and 150° F., bringing the hot reaction gases into contact with said aqueous solution of formaldehyde to halt the oxidation reaction and to extract preferentially from the reaction gases a portion of the formaldehyde contained therein, bringing the reaction gases into contact with water to extract preferentially the unabsorbed formaldehyde in said reaction gases to form a dilute solution of formaldehyde while the major portion of the remaining oxygenated products pass through the system in uncondensed form, and adding the dilute solution of formaldehyde to the circulating aqueous solution of formaldehyde.

4. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 5 to 25% and having a temperature of between about 100 and 150° F., bringing the hot reaction gases into contact with said aqueous solution of formaldehyde to halt the oxidation reaction and to extract preferentially from the reaction gases a portion of the formaldehyde contained therein, bringing the reaction gases into contact with water having a temperature of between about 60 and 120° F., to extract preferentially the unabsorbed formaldehyde in said reaction gases to form a dilute solution of formaldehyde while the major portion of the remaining oxygenated products pass through the system in uncondensed form, and adding the dilute solution of formaldehyde to the circulating aqueous solution of formaldehyde.

5. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 5 to 25% and having a temperature of between about 100 and 150° F., bringing the hot reaction gases into contact with said aqueous solution of formaldehyde to halt the oxidation reaction and to extract preferentially from the reaction gases a portion of the formaldehyde contained therein, bringing the reaction gases into contact with water having a temperature of between about 60 and 120° F., to extract preferentially the unabsorbed formaldehyde in said reaction gases to form a dilute solution of formaldehyde having a formaldehyde concentration of between 3 and 6% by weight while the major portion of the remaining oxygenated products pass through the system in uncondensed form, and adding the dilute solution of formaldehyde to the circulating aqueous solution of formaldehyde.

6. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 10 to 15% by weight and having a temperature of between about 100 and 150° F., bringing the hot reaction gases into contact with said aqueous solution of formaldehyde to halt the oxidation reaction and to extract preferentially from the reaction gases a portion of the formaldehyde contained therein, bringing the reaction gases into contact with water having a temperature of between about 60 and 120° F., to extract preferentially the unabsorbed formaldehyde in said reaction gases to form a dilute solution of formaldehyde while the major portion of the remaining oxygenated products pass through the system in uncondensed form, and adding the dilute solution of formaldehyde to the circulating aqueous solution of formaldehyde.

7. In a process for the production of mixed oxygenated organic compounds by the vapor phase partial oxidation of butane at an elevated temperature, wherein a mixture of hot reaction gases including formaldehyde, acetaldehyde, methanol, acetone, and methyl ethyl ketone is formed, the steps which comprise circulating an aqueous solution of formaldehyde having a formaldehyde concentration of between about 10 to 15% by weight and having a temperature of between about 100 and 150° F., bringing the hot reaction gases into contact with said aqueous solution of formaldehyde to halt the oxidation reaction and to extract preferentially from the reaction gases a portion of the formaldehyde contained therein, bringing the reaction gases into contact with water having a temperature of between about 60 and 120° F., to extract preferentially the unabsorbed formaldehyde in said reaction gases to form a dilute solution of formaldehyde having a formaldehyde concentration of between 3 and 6% by weight while the major portion of the remaining oxygenated products pass through the system in uncondensed form, and adding the dilute solution of formaldehyde to the circulating aqueous solution of formaldehyde.

HENRY K. DICE.

REFERENCES CITED

The following references are of record in the file of this patent:

UNITED STATES PATENTS

| Number | Name | Date |
|---|---|---|
| 1,715,253 | Sperr | May 28, 1929 |
| 1,851,550 | Tuttle | Mar. 29, 1932 |
| 2,241,674 | Mohr et al. | May 13, 1941 |
| 2,384,028 | Hall | Sept. 4, 1945 |
| 2,412,014 | Sherwood | Dec. 3, 1946 |
| 2,462,413 | Meath | Feb. 22, 1949 |